United States Patent Office 2,999,824
Patented Sept. 12, 1961

2,999,824
POLYEPOXIDE PRODUCTS
Fred G. Singleton, Pittsburgh, and William C. Hunt, Rosedale, Pa., assignors to H. H. Robertson Company, Pittsburgh, Pa., a corporation of Pennsylvania
No Drawing. Filed July 6, 1956, Ser. No. 596,147
9 Claims. (Cl. 260—18)

This invention relates to novel polyepoxide products and compositions.

In general the object of the invention is to produce novel polyepoxide products, both in uncured and cured form, which have novel characteristics and properties which render them highly useful for various industrial purposes.

With this general object in view and such others as may hereinafter appear, the invention consists in the novel products resulting from the esterification with a polyhydric alcohol and more particularly with a glycol, of a portion or all of the carboxyl groups of a half ester forming a component of a product resulting from mixing a polyepoxide material with a dicarboxylic acid half ester of a hydroxylated fatty acid ester of a polyhydric alcohol; and in the cured form of such products; and also in the other compositions and products hereinafter described and more particularly defined in the claims at the end of this specification.

In our copending application, Serial No. 596,146, filed July 6, 1956, and now abandoned, filed on even date herewith we have disclosed the production of novel products produced in both uncured and cured forms by the mixing of polyepoxide materials with coreactive plasticizers comprising dicarboxylic acid half esters of hydroxylated fatty acid esters of polyhydric alcohols and of the subsequent curing of such plasticized polyepoxide materials by heating, or the curing thereof at room temperatures utilizing a catalyst. These products are useful for many applications. There are, however, uses where the presence of the free carboxyl acid groups is undesirable.

We have discovered that superior and novel products may be produced by further esterifying the dicarboxylic acid half esters of the products described in and forming the subject matter of our copending application, above described, either in whole or in part by esterification with polyhydric alcohols and particularly with glycols. These novel products have been found to be excellent coreactive plasticizers for polyepoxide materials and particularly for epoxy resins. This further esterification of the terminal carboxyl groups forms more neutral, and in some instances substantially neutral, plasticizers which react with the polyepoxide materials to produce tough, thermoset materials having superior electrical properties.

In the invention set forth in our copending application it was found that polyepoxide materials, of which epoxy resins may be regarded as one example, are compatible with dicarboxylic acid half esters of hydroxylated fatty acid esters of polyhydric alcohols and that upon mixture of such materials novel products were produced having a high degree of industrial utility in that they may be caused to react as by being subjected to heating or by a catalyst and thereby produce tough, strong, thermoset materials having excellent electrical properties.

As also set forth in said copending application, certain acid esters produced by the reaction of polyhydric alcohol esters of hydroxylated fatty acids, such as castor oil, with dicarboxylic acids or dicarboxylic acid anhydrides, are compatible with epoxy resins and furthermore, that they react readily with said epoxy resins to produce tough, thermoset materials having excellent electrical properties.

Castor oil (glyceryl triricinoleate) is the most economical and readily available hydroxylated fatty acid ester of a polyhydric alcohol. In the interests of brevity and to facilitate description, references to "castor oil" will be understood to include in whole or in part of the esters of ricinoleic and other hydroxylated fatty acids, such as hydroxystearic acids, with glycols, pentaerythritol, and other polyhydric alcohols.

The epoxy resins which we have found suitable for use in the production of the products set forth in said copending application were glycidyl ethers of polyhydric alcohols and polyhydric phenols. Depending upon the proportions and conditions used, epoxy resins having epoxide equivalents ranging from about 140 to about 4000 can be prepared (the epoxide equivalent is defined as the number of grams of resin containing one gram equivalent of epoxide). The United States patent to Zech, No. 2,538,072, assigned to the Devoe and Raynolds Company describes one method used in the preparation of these epoxy resins. Glycidyl ethers of Bisphenol A that exemplify epoxy resins suitable for use in the present invention have the following generalized formula:

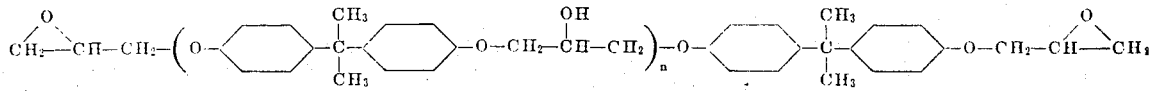

Glycidyl ethers are usually polymeric mixtures having different molecular weights. The measured molecular weight of the mixture is an average molecular weight. Epoxy resins useful in the present invention have more than one epoxy group per average molecular weight.

The aforesaid polyepoxide materials include polyepoxide compounds that cannot be classed as glycidyl ethers. Included are products prepared by the epoxidation of those unsaturated compounds containing more than one active point of unsaturation. Compounds in this category include butadiene dioxide, vinylcyclohexene dioxide, divinyl benzene dioxide and many others. Production of hydrogen peroxide in concentrated form, and more recently, the availability of peracetic acid, are making it possible for epoxidation to compete with the epichlorohydrin procedure in the manufacture of epoxide materials.

The castor-oil-glycol mixed esters of dicarboxylic acids that are useful in the present invention are prepared by reacting castor oil, a dicarboxylic acid or dicarboxylic acid anhydride, and a glycol. The process is preferably carried out in two steps, as follows: The castor oil is esterified with the dicarboxylic acid or dicarboxylic acid anhydride, and then the free carboxyl groups of the resulting half ester are esterified by heating with a glycol. This two-step procedure is preferred because it precludes the possibility of gelling the product because of too much cross-linking through the third hydroxyl group of the castor oil. It is quite practical, however, to use a one-step procedure in which all three reactants are placed in a reaction vessel and permitted to react together.

The following examples describe the preparation of several castor oil-glycol mixed esters of dicarboxylic acids that are useful in the present invention:

Example 1

936 g. (1 mole) castor oil
294 g. (3 moles) maleic anhydride
3.8 g. (0.3%) p-toluenesulfonic acid (esterification catalyst)

These reactants were placed in a round bottom three neck flask having provision for stirring and for the estab ent therein of a nitrogen atmosphere. A thermometer was provided and provision was made for the removal of water formed during the second part of the reaction. The temperature was raised to 160° C. and maintained at this level for one hour. At the end of this time 318 g. (3 moles) diethylene glycol were added. The temperature was raised to 220° C. and maintained until the theoretical quantity (54 cc.) was collected. This required about one hour. After cooling to room temperature the product was a fairly fluid light yellow liquid. Since this product is susceptible to vinyl polymerization at ordinary temperature it was inhibited with 300 parts per million of hydroquinone.

Example 2

936 g. (1 mole) castor oil
294 g. (3 moles) maleic anhydride

These reactants were cooked for one hour at 160° C. as in Example 1, and then 402 g. (3 moles) dipropylene glycol were added and the temperature was raised to 210° and maintained at this temperature for two hours. The product was even more fluid than that in Example 1.

Example 3

936 g. (1 mole) castor oil
444 g. (3 moles) phthalic anhydride

The first stage of the reaction was carried out as in Example 1, at 160° C. for one hour, and then 318 g. (3 moles) diethylene glycol were added. The temperature was raised to 210° C. and maintained at this temperature for three hours. The product was a light yellow oil having a viscosity of 7900 cps. at 25° C. and 1200 at 50° C.

Example 4

936 g. (1 mole) castor oil
444 g. (3 moles) phthalic anhydride

The first stage of the reaction was carried out as in Example 1, at 160° C. for one hour, and then 276 g. (3 moles) glycerol were added. The temperature was raised to 210° C. and maintained at this temperature for three hours. The product was a yellow liquid having a viscosity of 6000 cps. at 25° C.

Example 5

936 g. (1 mole) castor oil
1113 g. (3 moles) Het [1] anhydride
318 g. (3 moles) diethylene glycol

[1] Het anhydride is the trade name of the Hooker Electrochemical Company for hexachloroendomethylenetetrahydrophthalic anhydride.

The castor oil and Het anhydride were heated together at 160° C. for one hour. The diethylene glycol was then added, and the reaction was continued for three hours at 205° C.; the product was a light brown material having a viscosity of 13,500 cps. at 50° C.

The remaining examples Nos. 6 through 12 are concerned with reactions with epoxy resins of the castor oil-polyhydric alcohol esters of dicarboxylic acids (as prepared in the preceding examples Nos. 1 to 5).

Example 6

25 g. diethylene glycol castor oil maleate (Example 1)
25 g. Epon 828
5 g. diethylene triamine At room temperature this composition became very viscous after one hour and did not pour after four hours. It was very soft and tough after 20 hours.

|  | Megohms |
|---|---|
| Insulation resistance (25° C.) | 30,000 |
| Insulation resistance (120° C.) | 1,000 |

Similar compositions containing half and twice as much diethylene triamine did not gel in twenty hours.

Example 7

The effect on the physical and electrical properties of the product of different amounts of the diethylene glycol castor oil maleate (Example 1) used is shown in the following table. Cures in all cases were 20 hours at room temperature.

| | Compositions | | |
|---|---|---|---|
| | A | B | C |
| Diethylene glycol castor oil maleate, grams | 25 | 17 | 12 |
| Epon 828, grams | 25 | 34 | 36 |
| Diethylene triamine, grams | 5 | 5 | 5 |
| Insulation resistance, 770° F., megohms | 1,000,000 | 30,000 | 3,500 |
| Hardness, Shore D | 65 | 30 | 10 |

Example 8

The reaction of the glycol-castor oil mixed esters of dicarboxylic acids with epoxy resins can also be catalyzed with "Lewis" acids, such as boron fluoride, aluminum chloride and stannic chloride.

150 g. diethylene glycol castor oil maleate (Example 1)
50 g. Bakelite ERL-2774
0.6 g. $BF_3 400$ [1]

[1] $BF_3 400$ is the boron fluoride monoethyl amine complex as supplied by the Shell Chemical Company.

Fifty grams of this composition were placed in a beaker and heated in an oven at 140° C. for four hours. The product was a very tough, thermoset material which, after cooling, had a Shore A hardness of 12.

Example 9

25 g. diethylene glycol castor oil phthalate (Example 3)
25 g. Epirex 504 (epoxy resin supplied by Devoe & Raymolds Co.—composition unknown)
0.15 g. $BF_3 400$ Heated in a glass beaker in an oven at 140° C. for four hours. The product was a tough thermoset material having a Shore A hardness of 23.

Example 10

150 g. glyceryl castor oil phthalate (Example 4)
50 g. Bakelite ERL-2774
0.6 g. $BF_3 400$ Fifty grams of this composition were placed in a beaker and heated in an oven at 140° C. for 15 hours. The product was a tough, thermoset material having a Shore A hardness of 12. The insulation resistance at room temperature was 30,000 megohms.

Example 11

The following table shows the effect of concentration of the plasticizer of Example 3 on hardness and insulation resistance when diethylene triamine was used as a catalyst. The amount of amine catalyst was 10% of the "plasticizer" in all cases.

| Plasticizer+10% DET, grams | Epon 828, grams | Hardness, Shore D | Insulation Resistance Megohms |
|---|---|---|---|
| 17 | 34 | 75 | 1,000,000 |
| 25 | 25 | 45 | 1,000,000 |
| 34 | 17 | 25 | 9,000 |
| 36 | 12 | 15 | 4,500 |

Example 12

25 g. Epirez 504
25 g. diethylene glycol castor oil Hetate (Example 5)
0.15 g. $BF_3 400$ Baked in a 100 cc. beaker for 6 hours at 140° C. The product was very tough. The insulation resistance was 200,000 megohms at 77° F.

If it is desired to utilize any of those polyepoxide compounds which, as above set forth, are not glycidyl ethers, including the products which may be prepared by the epoxidation of compounds having two or more active points of unsaturation, the procedures may follow generally those indicated in the foregoing examples for the production of the cured and uncured products, and the most desirable proportions may be readily determined by experimentation.

These examples show that the coreactive plasticizers of the present invention react with polyepoxide materials under several different conditions to give novel and useful products.

The present invention contemplates the production of highly useful thermoset products, and the range of proportions of different products may vary widely depending on the particular components from which a particular product is made following the procedures and as indicated in the examples above described.

In some instances the products of the present invention may be made without catalysts and solutions of the coreactive plasticizers in the polyepoxide materials have been found to be stable for substantial periods of time, at least two months, thus rendering practicable the production and shipment of such thermosetting epoxy resins and polyepoxide materials requiring no addition of catalyst by the consumer. It has also been found that with a catalyst such as ethyl amine complex of boron trifluoride the reaction is accelerated and quicker cures are possible, and if desired other "Lewis" acids, such as aluminum chloride and stannic chloride, may be used. The room temperature tank life is adequate for most purposes but shipping the precatalyzed resin is not recommended.

Amine catalysts of the general type above referred to cure the products of the present invention at room or slightly elevated temperatures. The procedure is similar to that used with unmodified epoxy resins and has the advange that tough, flexible products can be produced.

All of the dicarboxylic acids and anhydrides that have been tried have been found suitable for use in the present invention, although it has been necessary in some cases to heat the materials in order to achieve homogeneous solutions. Materials used and found suitable are maleic anhydride, maleic acid, fumaric acid, citraconic anhydride, citraconic acid, itaconic acid, phthalic acid, phthalic anhydride, tetrachlorophthalic anhydride, oxalic acid, succinic anhydride, adipic acid, azelaic acid, sebacic acid, dichloromaleic anhydride, Het anhydride (see Example 5), tetrahydrophthalic anhydride, and Nadic anhydride (3.6-endomethylene-1,2,3,6-tetra-hydro-cis-phthalic anhydride manufactured by the National Aniline Division of the Allied Chemical and Dye Corporation).

Having thus described the invention, what is claimed is:

1. The uncured thermosetting mixture consisting of a resinous polymeric epoxide having an epoxide equivalent ranging from about 140 to about 4000, and an ester formed by reacting castor oil and an organic acid selected from the group consisting of dicarboxylic acids, the two carboxyl groups of which are joined solely by carbon-to-carbon linkages, and the anhydrides thereof in the proportion of approximately three mols of said acid per mol of castor oil, said ester having at least a portion of the free carboxyl groups thereof esterified with a polyhydric alcohol selected from the group consisting of glycerin and a glycol.

2. The mixture defined in claim 1 wherein all of the carboxyl groups of said ester are esterified with said polyhydric alcohol.

3. The mixture defined in claim 1 in which said polyhydric alcohol is a glycol.

4. The cured product produced by curing the catalyzed product defined in claim 1.

5. The cured product produced by curing the catalyzed product defined in claim 2.

6. The cured product produced by curing the catalyzed product defined in claim 3.

7. The product as defined in claim 1 in which the proportions of said ester and said polymeric epoxide lie within the range of about 1 to 1 and 1 to 2.

8. The uncured thermosetting mixture consisting of a resinous polymeric epoxide having an epoxide equivalent ranging from about 140 to about 4000 and an ester formed by reacting castor oil and an organic acid selected from the class consisting of dicarboxylic acids, the two carboxyl groups of which are joined solely by carbon-to-carbon linkages, and the anhydrides thereof in the proportion of approximately three mols of said acid per mol of caster oil, said ester having substantially all of the free carboxyl groups thereof esterified with a polyhydric alcohol selected from the group consisting of glycerin and a glycol, and an effective quantity of ethylamine complex catalyst.

9. The cured product produced by curing the catalyzed product defined in claim 8.

References Cited in the file of this patent

UNITED STATES PATENTS

| | | |
|---|---|---|
| 2,324,483 | Castan | July 20, 1943 |
| 2,491,811 | Ham | Dec. 20, 1949 |
| 2,591,539 | Greenlee | Apr. 1, 1952 |
| 2,674,648 | Nicodemus | Apr. 6, 1954 |
| 2,683,131 | Cass | July 6, 1954 |
| 2,691,004 | Doyle | Oct. 5, 1954 |
| 2,729,618 | Muller et al. | Jan. 3, 1956 |
| 2,785,383 | Foster | Mar. 12, 1957 |
| 2,863,855 | Wilson et al. | Dec. 9, 1958 |

FOREIGN PATENTS

| | | |
|---|---|---|
| 470,472 | Great Britain | Aug. 13, 1937 |

OTHER REFERENCES

Moeller: Inorganic Chemistry, pages 326–328, John Wiley & Sons (1952).